United States Patent [19]

Moran

[11] Patent Number: 4,833,585

[45] Date of Patent: May 23, 1989

[54] ZONE FILTER

[75] Inventor: Steven A. Moran, Mt. Lebanon, Pa.

[73] Assignee: Westinghouse Electric Corp., Pittsburgh, Pa.

[21] Appl. No.: 227,575

[22] Filed: Aug. 3, 1988

[51] Int. Cl.[4] .............................................. H02M 1/12
[52] U.S. Cl. ...................................... 363/39; 363/45; 307/105
[58] Field of Search ...................... 363/39, 41, 45, 46, 363/48; 323/205, 207, 208, 209, 210; 307/105

[56] References Cited

U.S. PATENT DOCUMENTS

| | | | |
|---|---|---|---|
| 3,155,875 | 11/1964 | Wenrich et al. | |
| 3,541,425 | 11/1970 | Weidmann | 363/39 X |
| 3,559,031 | 1/1971 | La Vigna | |
| 3,628,057 | 12/1971 | Mueller | 307/105 |
| 3,825,814 | 7/1974 | Pelly | |
| 3,825,815 | 7/1974 | Gyugyi et al. | |
| 4,241,395 | 12/1980 | Stacey et al. | 363/39 |
| 4,502,104 | 2/1985 | Mitchell | 363/26 |
| 4,504,897 | 3/1985 | Blackwood | 363/39 |
| 4,532,581 | 7/1985 | Miyairi | 363/39 |
| 4,651,265 | 3/1987 | Stacey et al. | 363/39 X |
| 4,706,177 | 11/1987 | Josephson | 363/24 |
| 4,709,323 | 11/1987 | Lien | 363/97 |

Primary Examiner—Patrick R. Salce
Assistant Examiner—Emanuel Todd Voeltz

[57] ABSTRACT

The present invention pertains to an AC electrical distribution system. The AC distribution system includes at least one nonlinear load. The nonlinear load causes distortion voltage in the AC distribution system. The AC distribution system also includes a zone filter which provides voltage to the AC distribution system. The AC distribution system can have a first zone which includes a nonlinear load and can have a second zone which includes at least one sensitive load. The zone filter regulates the voltage in the first zone as applied to the second zone and essentially eliminates the distortion voltage in the first zone as applied to the second zone. The zone filter can include a transformer device which provides a voltage to the AC distribution system. There is also a device for supplying power to the transformer device. Additionally, there is a sensor circuit for determining the distortion voltage and a fundamental voltage in the AC distribution system and providing a distortion and fundamental voltage correcting signal to the transformer device. The distortion and fundamental voltage correcting signal controls the transformer device such that the voltage in the first zone is regulated and voltage opposite to the distortion voltage is added to the first zone as applied to or subtracted from the second zone of the AC distribution system.

8 Claims, 2 Drawing Sheets

ZONE FILTER

FIELD OF THE INVENTION

The present invention relates to a filter for electrical distribution systems. More specifically, the present invention relates to a zone filter for distortion voltage in an AC distribution system.

BACKGROUND OF THE INVENTION

Alternating Current [AC]distribution systems operate most efficiently with a distortion free sine wave voltage present. When an AC distribution system has nonlinear loads, typically distortion voltage is introduced by such nonlinear loads into the AC distribution system. These distortions are illustratively represented in the sine wave shown in FIG. 1 for a given AC distribution system.

Attempts to correct the distortion voltage, also known as the harmonic part of the voltage, have included adding active power filters to the AC distribution system. See, for instance, U.S. Pat. No. 3,825,815 which provides for the ability to compensate for the distortion voltage. Heretofore, there have been no filters that could compensate for the distortion voltage completely, as well as provide voltage regulation in order to insure a voltage with the proper amplitude.

Moreover, these prior art active filters must be sized according to the high power distortion producing nonlinear loads. This requires that the filter must be capable of providing high peak compensating currents.

The present invention is capable of compensating for the distortion voltage as well as provide voltage regulation. Additionally, the present invention is capable of zone filtering. That is, the present invention is capable of providing the power required by the sensitive, usually low power loads in a zone and protecting them from the distortion voltage due to the nonlinear loads in another zone of the AC distribution system.

SUMMARY OF THE INVENTION

The present invention pertains to a zone filter. The zone filter is comprised of transformer means which provides voltage to a first zone of an electric circuit. There is also means for supplying power to the transformer means. Additionally, there is a sensor circuit for determining a distortion voltage and a fundamental voltage in the electric circuit and providing a distortion and fundamental voltage correcting signal to the transformer means. The distortion and fundamental voltage correcting signal controls the transformer means such that voltage is regulated in the first zone of the electric circuit as applied to a second zone thereof and voltage opposite to the distortion voltage is added to or subtracted from the first zone of the electric circuit by the transformer means so the distortion voltage in the second zone of the electric circuit is essentially eliminated.

The sensor circuit determines the fundamental voltage and the harmonic voltage in the first zone and produces a distortion and fundamental voltage correcting signal. The distortion and fundamental voltage correcting signal controls the transformer means such that power from the power supply means is used to cause the transformer means to regulate the voltage in the first zone as it is applied to the second zone and to add or subtract voltage from the voltage in the first zone so distortion voltage is essentially eliminated in the second zone.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 2:
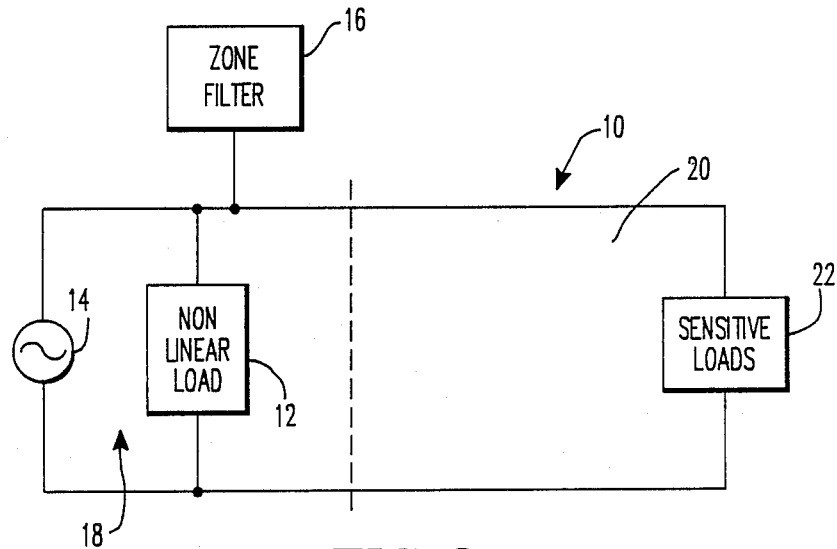
FIG. 2 is a schematic representation of an electrical distribution system.

Referring to the drawings, wherein like reference numerals designate identical or corresponding parts throughout the several views, and more particularly to FIG. 2 thereof, there is schematically shown an electric circuit 10 such as an AC electrical distribution system. The electric circuit 10 is comprises of at least one nonlinear load 12. The nonlinear load 12 causes distortion voltage in the electric circuit 10.

The electric circuit 10 can be divided into, for instance, a first zone 18 which includes the nonlinear load 12, and a second zone 20 which includes at least one sensitive load 22. A zone filter 16 regulates the voltage in the first zone 18 as applied to the second zone 20 and adds or subtracts a voltage to the first zone 18 which is essentially opposite to the distortion voltage caused by the nonlinear load 12, essentially eliminating the distortion voltage in the second zone 20.

Figure 3:
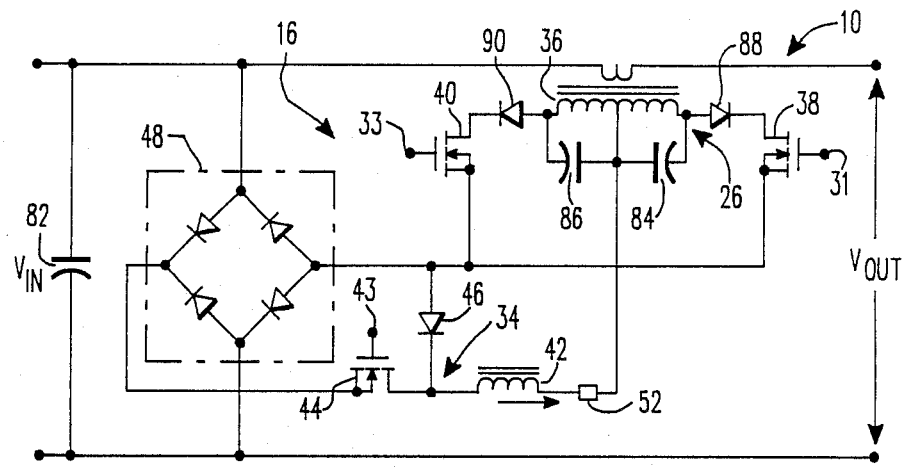
FIG. 3 is a schematic representation of a zone filter.
Figure 4:
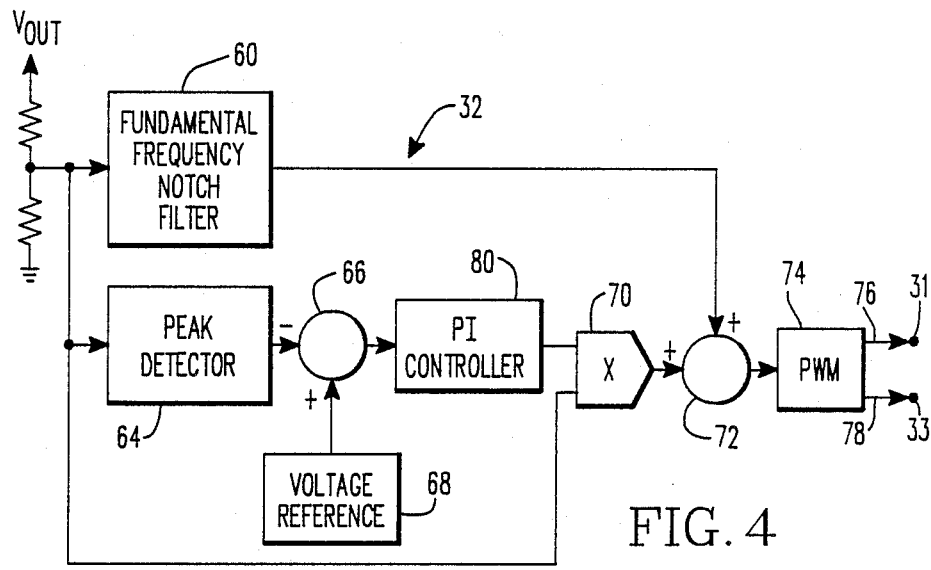
FIG. 4 is a schematic representation of a sensor circuit.

Referring to FIG. 3 there is schematically shown an example of a zone filter 16 electrically connected in an electric circuit 10. The zone filter 16 is preferably comprised of transformer means 26 which provides a voltage to the first zone 18 of the electric circuit. The zone filter 16 also preferably includes means for supplying power to the transformer means 26 and a sensor circuit 32 (see FIG. 4) for detrmining a distortion voltage and a fundamental voltage in the electric circuit 10 and providing a distortion and fundamental voltage correcting signal to the transformer means 26. A preferred sensor circuit 32 is shown in FIG. 4 and described in detail herein below. Sensor circuit 32 is electrically connected to the transformer means 26 and the electric circuit 10. The distortion voltage correcting signal provided by the sensor circuit 32 controls the transformer means 26 such that voltage is regulated in the first zone 18 of the electric circuit 10 as applied to the second zone 20, and a voltage opposite the distortion voltage is added to or subtracted from the first zone 18 of the electric circuit 10 by the transformer means 26 so the distortion voltage in the second zone 20 of the electric circuit 10 is essentially eliminated.

Figure 5:
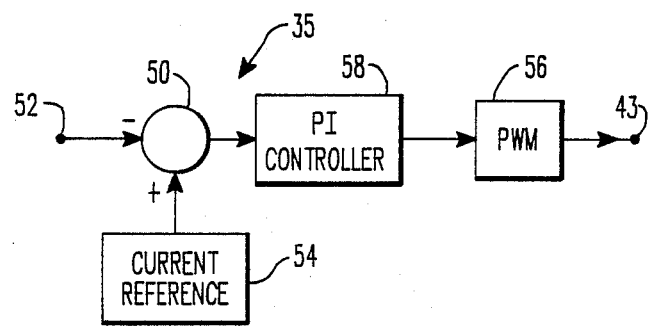
FIG. 5 is a schematic representation of a control circuit.

The power supply means of zone filter 16 preferably includes an inductor means 34, as shown in FIG. 3. The inductor means 34 supplies current to the transformer means 26. The inductor means 34 has a current input and a current output which are connected to the transformer means 26 such that current from the inductor means 34 flows to the transformer means 26 and returns to the inductor means 34. The power supply means also includes a control circuit 35 for regulating the current in the inductor means. The control circuit is shown in FIG. 5.

The transformer means 26 of the zone filter 16 preferably includes a transformer 36. The transformer 36 regulates voltage in the first zone 18 as applied to the second zone 20 and provides to the electric circuit 10 voltage opposite to the distortion voltage in the first zone 18 so the distortion voltage in the second zone 20 is essentially eliminated. The inductor means 34 current output is electrically connected to the transformer 36.

The transformer means 26 also preferably includes a first transformer MOSFET 38 and a second transformer MOSFET 40. The first transformer MOSFET 38 and the second transformer MOSFET 40 are electrically connected in series with the transformer 36 therebetween. The direction the current from the inductor means 34 flows through the transformer 36 is determined by which of the first and second transformer MOSFETS 38, 40, respectively, is on. The direction the current flow through the transformer 36 determines whether the voltage provided to the electric circuit 10 by the transformer 36 adds to or subtracts from the voltage in the first zone 18. The first and second transformer MOSFETS 38, 40, respectively, are also electrically connected to the sensor circuit 32 at points 31 and 33, respectively. The sensor circuit 32 controls the first and second transformer MOSFETS 38, 40. The first and second transformer MOSFETS 38, 40 are also connected to the inductor means 34 input such that current passing through transformer 36 and the respective transformer MOSFET, returns to the inductor means 34.

The inductor means 34 of the zone filter 16 preferably includes an inductor 42. The inductor 42 supplies current to the transformer 36. The inductor 42 has an input and an output. The output of the inductor 42 is electrically connected to the transformer 36 and the first and second transformer MOSFETS 38, 40 at a point therebetween.

The inductor means 34 also includes a third MOSFET 44 which is electrically connected to the input of the inductor 42. The third MOSFET 44 is capable of increasing the inductor 42 current when the third MOSFET 44 is on. The third MOSFET 44 is electrically connected to the control circuit 35 at point 43 such that the third MOSFET 44 is turned on by the control circuit 35 when the inductor 42 current is to be increased.

Additionally, in the inductor means 34 there is a first diode 46. The first diode 46 is electrically connected to the first and second transformer MOSFETS 38, 40 and to the input of the inductor 42 such that when the third MOSFET 44 is off, current from the transformer 36 and the respective transformer MOSFET returns to the inductor 42.

There is also a bridge circuit 48 included in the inductor means 34. The bridge circuit 48 allows for current flow through the third MOSFET 44 only in the direction toward the input of the inductor 42. The bridge circuit 48 is electrically connected to the first diode 46 and the third MOSFET 44 such that when the third MOSFET 44 is on, current from the transformer 36 and the respective transformer MOSFET flows through the bridge circuit 48 to the third MOSFET 44 and to the input of the inductor 42. The bridge circuit is also electrically connected to the first zone 18 and provides for fundamental frequency current to be received by the zone filter 16 therefrom. (Note this fundamental frequency current becomes a high frequency current due to the third MOSFET switching on and off).

The control circuit 35 of the zone filter 16, shown in FIG. 5, preferably includes a first subtractor 50. The first subtractor 50 is electrically connected to the output of the inductor 42, for instance, at point 52 of FIG. 3. The control circuit 35 also preferably includes a current reference 54 which is electrically connected to the subtractor 50 and provides a current thereto. The current provided to the subtractor 50 by the current reference 54 is ideally the current that is desired in the inductor 42. The subtractor 50 provides a signal that is essentially the difference between a current signal corresponding to the current in the inductor 42 and the current reference 54. Additionally, the control circuit 35 preferably includes a second pulse width modulator (PWM) 56 which is electrically connected to the subtractor 50 and the third MOSFET 44. The second PWM 56 provides a signal which controls the third MOSFET 44 in accordance with the signal it receives from the subtractor 50. A proportional-integral (PI) controller 58 is preferably inserted beween the subtractor 50 and the PWM 56 to increase the steady state gain.

The sensor circuit 32 is electrically connected to the electric circuit 10 at the output of the transformer 36 providing voltage to the first zone 18 of the electric circuit 10. Referring to FIG. 4, the sensor circuit 32 preferably includes means for determining distortion voltage in the first zone and producing a distortion voltage correcting signal corresponding to the distortion voltage, such as a fundamental frequency notch filter 60. The fundamental frequency notch filter 60 produces a signal corresponding to a harmonic part of the voltage of the first zone 18. (The harmonic part of the voltage is the distortion voltage). The fundamental frequency notch filter 60 is electrically connected to the electric circuit 10.

The sensor circuit 32 preferably also includes means for determining a fundamental voltage and producing a fundamental voltage correcting signal corresponding to the fundamental voltage. The fundamental voltage determining means preferably includes a peak detector 64 which produces a DC current corresponding to the amplitude of the voltage in the first zone 18 of the electric circuit 10. The peak detector 64 is electrically connected to the first zone 18 of electric circuit 10. A second subtractor 66 is electrically connected to the peak detector 64. There is a voltage reference 68 which is electrically connected to the subtractor 66. The voltage reference 68 provides a voltage reference signal to the subtractor 66. The subtractor 66 produces a DC signal corresponding to the difference between the signal from the peak detector 64 and the signal from the voltage reference 68.

A multiplier 70 is electrically connected to the subtractor 66 and the first zone 18 of the electric circuit 10. The multiplier 70 produces a desired AC modulating waveform signal corresponding to the DC signal from the subtractor 66 and the voltage of the electric circuit 10. This AC modulation waveform signal is used to regulate the voltage in the first zone 18 as applied to the second zone 20.

The sensor circuit 32 also includes an adder 72 which is electrically connected to the multiplier 70 and the fundamental frequency notch filter 60. The adder 72 produces a signal corresponding to the sum of the signal from the multipler 70 and the signal from the fundamental frequency notch filter 60. A first PWM 74 is electrically connected to the adder 72. The first PWM 74 has a first output 76 electrically connected to the first transformer MOSFET 38, and a second output 78 electrically connected to the second transformer MOSFET 40. The first PWM provides the distortion and fundamental voltage correcting signal which includes a first and second drive signal to the first and second transformer MOSFETS 38, 40, respectively. A second PI controller 80 can be electrically inserted between the subtractor 66 and the multiplier 70 to increase the steady state gain.

The zone filter 16 can also include a first capacitor 82. The first capacitor 82 is electrically connected across the first zone 18 of the electric circuit 10. The first capacitor 82 is a high frequency bypass filter.

The transformer means 26 also can include a second capacitor 84 and a third capacitor 86 electrically connected in series. The output of the inductor 42 is electrically connected therebetween. Moreover, the second and third capacitors 84, 86 are electrically connected in parallel with the transformer 36.

The transformer means 26 can additionally have a second diode 88 and a third diode 90 electrically connected in series between the transformer 36 and the first and second transformer MOSFETS 38, 40, respectively. The second and third diodes 88, 90 allow current to pass only in one direction from the transformer 36 to the respective transformer MOSFET.

In the operation of the preferred embodiment, zone filter 16, see FIG. 3, has transformer 36 through which additional voltage is added to or subtracted from the first zone 18 of the electric circuit 10 such that voltage is regulated and any distortion voltage is essentially eliminated in the second zone 20 thereof.

Figure 1:
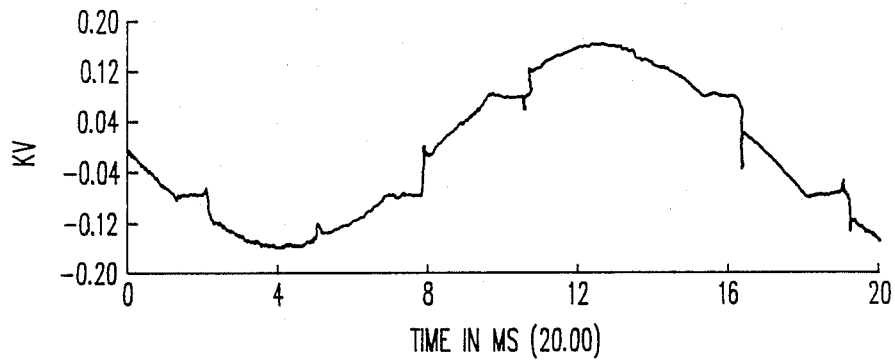
FIG. 1 is a sine wave voltage signal having voltage distortion.
Figure 6:
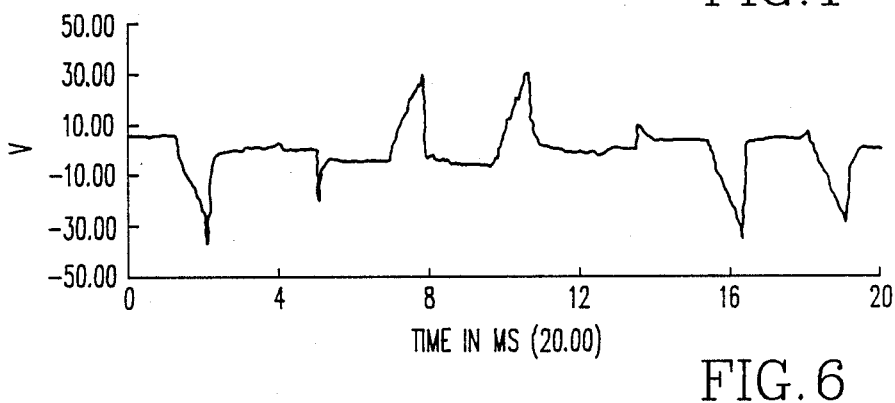
FIG. 6 is a signal with respect to the harmonic part of the voltage.

The distortion voltage and fundamental voltage of the first zone 18 is detected by the sensor circuit 32. The Vout of the sensor circuit 32 is electrically connected to the zone filter 16 at the position identified by Vout in FIG. 3. The distortion voltage in the first zone 18 is determined by a fundamental frequency notch filter 60 of the sensor circuit 32. The fundamental frequency notch filter 60 produces a single which corresponds to the harmonic part of the voltage. With respect to the signal of FIG. 1 present in the first zone 18, a signal of the fundamental frequency notch filter 60 is shown in FIG. 6.

The voltage of the first zone 18 is also detected by a peak detector 64 of the sensor circuit 32. The peak detector 64 produces a DC signal proportional to the peak amplitude of the voltage of the first zone 18. The DC signal is subtracted from a voltage reference signal in second subtractor 66. The resulting DC signal from the subtractor 66 corresponds to the difference, if any, of the amplitude of the voltage. The DC signal originating from the second subtractor 66 is amplified by a second PI controller 80. The signal from the second PI controller 80 is received by a multiplier 70. The multiplier 70 multiplies the DC signal from the PI controller 80 by the voltage of the first zone 18 as applied to the second zone 20 and produces a sinusoidal voltage signal that results in a desired modulating waveform signal. The signal from the multiplier 70 with the desired modulating waveform is received by an adder 72. The adder 72 produces a signal that corresponds to the sum of the signal from the notch filter 60 and the signal of the multipler 70.

The signal from the adder 70 is received by a first PWM 74. The first PWM 74 has a first output 76 and a second output 78 which are electrically connected to a first transformer MOSFET 38 and a second transformer MOSFET 40, respectively, as shown in FIG. 3. When the first transformer MOSFET 38 is on, the second transformer MOSFET 40 is off, and vice versa. Depending on which transformer MOSFET is on, a fundamental voltage is produced across the transformer 36 which adds voltage to or subtracts voltage from the first zone 18 so as to maintain a regulated output voltage thereof and compensate for the distortion voltage therein as applied to the second zone.

In order for the transformer 36 to operate effectively, a constant DC current must be maintained in an inductor 42. A control circuit 35, described in connection with FIG. 5, maintains a regulated current in the inductor 42. The control circuit 35 is electrically connected to the zone filter 16 at point 52.

The control circuit 35 receives a current signal corresponding to the current in the inductor from point 52 of the zone filter 16 at the first subtractor 50. The first subtractor 50 also receives a current reference signal and produces a signal corresponding to the difference between the current reference signal and the current signal from the point 52 of the zone filter 16.

The signal produced by the first subtractor 50 is received by a PI controller 58 which amplifies the signal. The amplified signal is received by a first PWM 56 which produces a signal that is used to switch a third MOSFET 44 in order to control the inductor 42 current.

When the third MOSFET 44 is turned on by the signal from the PWM 56, the inductor 42 current increases until a desired current therethrough is reached. The control circuit 35 then provides a signal which turns off the third MOSFET 44.

When the third MOSFET 44 is on, current flows through the inductor 42, to the transformer 36, through the bridge circuit 48 and back to the third MOSFET 44. When the third MOSFET 44 is turned off, current from the transformer flows through the first diode 46 back to the inductor 42. The bridge circuit 48 insure that current flows through a third MOSFET 44 only in the direction toward the inductor 42.

A first capacitor 82 serves as a high frequency bypass filter with respect to the electric circuit 10 and prevents any high frequency component of the third MOSFET 44 from flowing in the electric circuit 10. A second capacitor 84 and a third capacitor 86, each of which are in parallel to the transformer 36, serve as high frequency bypass filters with respect to a high frequency component of the current due to the MOSFETS turning on and off. The transformer Mosfets determine which of the second or third capacitors pass the high frequency component of the current and in which direction a low frequency component of the current passes through the transformer 36. For instance, when the first transformer MOSFET 38 is turned on, the high frequency component of the current passes through capacitor 84 to a second diode 88. The low frequency component of the current passes through the transformer 36 to the second diode 88. The high and low frequency components then travel through the first transformer MOSFET 38 and to the bridge circuit 48.

When the second MOSFET 40 is turned on, and thus the first MOSFET 38 is turned off, the above description of the current path through the transformer 36 and capacitor 84 is applicable, except the high and low components of the current flow instead through third capacitor 86 and transformer 36, respectively, toward a third diode 90 and through the second MOSFET 40.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A zone filter comprising:
   transformer means for providing a voltage to a first zone of an electric circuit;
   inductor means for supplying power to the transformer means, said inductor means having a current input and a current output which are connected to the transformer means such that current from the inductor means flows to the transformer means and returns to the inductor means;
   a control circuit for regulating the current in the inductor means; and
   a sensor circuit for determining a distortion voltage and a fundamental voltage in the electric circuit and providing a distortion and fundamental voltage correcting signal to the transformer means, said sensor circuit electrically connected to the transformer means and the first zone of the electric circuit, said distortion and fundamental voltage correcting signal controlling the transformer means such that the voltage in the first zone of the electric circuit is regulated as applied to a second zone of the electric circuit and a voltage opposite to the distortion voltage is added to or subtracted from the first zone of the electric circuit by the transformer means so the distortion voltage in the second zone of the electric circuit is essentially eliminated.

2. A zone filter as described in claim 1 wherein the transformer means includes a transformer for regulating the voltage in the first zone of the electric circuit as applied to the second zone and providing to the first zone of the electric circuit voltage opposite to the distortion voltage for essentially eliminating distortion voltage in the second zone, said inductor means current output electrically connected to the transformer; a first transformer MOSFET and a second transformer MOSFET electrically connected in series with the transformer therebetween, said current from the inductor means flowing through the transformer in a direction determined by which of the first and second transformer MOSFETS are on, said first or second transformer MOSFETS also electrically connected to the sensor circuit which controls the first and second transformer MOSFETS, and to the inductor means input such that current passing through the transformer and the respective transformer MOSFET, returns to the inductor means.

3. A zone filter as described in claim 2 wherein the sensor circuit includes means for determining the distortion voltage and producing a distortion voltage correcting signal corresponding to the distortion voltage; means for determining the fundamental voltage and producing a fundamental voltage correcting signal corresponding to the fundamental voltage; an adder electrically connected to the distortion voltage determining means and the fundamental voltage determining means for producing a correcting signal corresponding to the sum of the distortion voltage correcting signal and the fundamental voltage correctig signal; and a first pulse width modulator electrically connected to the adder and having a first output electrically connected to the first transformer MOSFET and a second output electrically connected to the second transformer MOSFET, said first pulse width modulator provides the distortion and fundamental voltage correcting signal which includes a first and second drive signal, said first and second drive signals provided to the first and second transformer MOSFETS, respectively.

4. A zone filter as described in claim 3 wherein the inductor means includes
   an inductor for supplying current to the transformer, said inductor having an input and an output with said output electrically connected to the transformer;
   a third MOSFET electrically connected to the input of the inductor, said third MOSFET increases the inductor current when the third MOSFET is on, said third MOSFET electrically connected to the control circuit such that the third MOSFET is turned on by the control circuit when the inductor current is to be increased;
   a first diode electrically connected to the first and second transformer MOSFET and to the input of the inductor such that when the third MOSFET is off, current from the transformer and the respective transformer MOSFET returns to the inductor; and
   a bridge circuit for providing current flow through the third MOSFET only in the direction toward the input of the inductor, said bridge circuit electrically connected to the third diode and the third MOSFET such that when the third MOSFET is on current from the transformer and the respective transformer MOSFET flows through the bridge circuit to the third MOSFET and to the input of the inductor, said bridge circuit also electrically connected to the electric circuit.

5. A zone filter as described in claim 4 wherein the control circuit includes a first subtractor electrically connected to the output of the inductor;
   a current reference electrically connected to the subtractor for providing a current thereto, said subtractor providing a signal corresponding to the difference between the current from the inductor and the current from the current reference; and
   a second pulse width modulator electrically connected to the subtractor and to the third MOSFET, said first pulse width modulator providing a signal which controls the third MOSFET in accordance with the signal it receives from the subtractor.

6. A zone filter as described in claim 5 wherein the distortion voltage determining means and the fundamental voltage determining means are electrically connected to the first zone of the electric circuit at the output of the transformer for providing voltage to the electric current, said distortion voltage determining means includes a fundamental frequency notch filter for producing a signal corresponding to a harmonic part of the voltage of the electric circuit, said fundamental frequency notch filter being electrically connected to the first zone of the electric circuit; and wherein the fundamental voltage determining means includes a peak detector for producing a DC current corresponding to the amplitude of the voltage of the electric circuit, said peak detector being electrically connected to the first zone of the electric circuit;

a second subtractor electrically connected to the peak detector;

a voltage reference electrically connected to the subtractor and providing a voltage reference signal thereto, said subtractor producing a DC signal corresponding to the difference between the signal from the peak detector and the signal from the voltage reference;

a multiplier electrically connected to the subtractor and the electric current and producing a desired modulating waveform signal corresponding to the DC signal from the subtractor and the voltage of the electric circuit;

said adder electrically connected to the multiplier and the fundamental frequency notch filter and producing a signal corresponding to the sum of the signal from the multipler and the signal from the fundamental frequency notch filter.

7. A zone filter as described in claim 6 including a first capacitor being electrically connected across the first zone of the electric circuit, said first capacitor being a high bypass filter.

8. A zone filter as described in claim 7 wherein the transformer means also includes a second and third capacitor electrically connected in series and the output of the inductor electrically connected therebetween, said second and third capacitors electrically connected in parallel with the transformer;

a second and third diode electrically connected in series between the transformer and the first and second transformer MOSFET, respectively, said second and third diodes allowing current to pass from the transformer to the respective transformer MOSFET.

* * * * *